United States Patent [19]
Barnes et al.

[11] 3,859,192
[45] Jan. 7, 1975

[54] APPARATUS FOR THE MEASUREMENT OF THE OXYGEN CONTENT OF A GAS STREAM

[75] Inventors: Lyle K. Barnes, Michigan City, Ind.; J. Kenneth Jacobsen, Madeira Beach, Fla.

[73] Assignee: Milton Roy Company, St. Petersburg, Fla.

[22] Filed: Aug. 17, 1973

[21] Appl. No.: 389,127

[52] U.S. Cl. ............................................. 204/195 S
[51] Int. Cl. ...................... G01n 27/28, G01n 27/46
[58] Field of Search............. 204/195 S, 1 T; 324/29

[56] References Cited
UNITED STATES PATENTS
3,620,931  11/1971  Reichner ............................ 204/1 T
3,791,937  2/1974  Besson et al. ...................... 204/1 R Primary Examiner—G. L. Kaplan
Attorney, Agent, or Firm—Woodcock, Washburn, Kurtz & Mackiewicz

[57] ABSTRACT

A sensor measures the oxygen content of sample gas flowing in a stream in a conduit. A tube of solid electrolyte material has a closed end and an open end adapted to be secured to the conduit with the open end in communication with the sample stream flowing in the conduit. A baffle disposed inside the tube has one end extending into the conduit and the other end extending to the closed end of the tube so that a portion of the sample gas stream is deflected across one surface of the baffle into the closed end of the tube and over the other surface of the baffle back into the sample gas stream. Electrodes on the outer and inner surface of the closed end of the tube measure the oxygen partial pressure of the deflected portion of the sample stream.

4 Claims, 5 Drawing Figures

PATENTED JAN 7 1975

APPARATUS FOR THE MEASUREMENT OF THE OXYGEN CONTENT OF A GAS STREAM

BACKGROUND OF THE INVENTION

This invention relates to the measurement of the oxygen content of a gas stream and more particularly to an improved solid state electrolyte oxygen measuring sensor.

It has long been recognized that cells including electrodes in contact with certain solid electrolytes produce an emf which is a function of oxygen concentration across the cell. Kiukkola and Wagner, "Measurements on Galvanic Cells Involving Solid Electrolytes," *Journal of the Electro-Chemical Society*, vol. 104, no. 6, June 1957, describes a stabilized zirconium oxide cell used to measure oxygen concentration.

This type of cell has been successfully adapted to many commercial uses. Closed-end zirconium oxide tubes have been used to measure the oxygen content of a flowing gas stream, for example flue gas. In U.S. Pat. No. 3,720,594 — Wilson the closed end of the tube is inserted in the gas conduit. In U.S. Pat. No. 3,514,377 — Spacial, et al. the entire tube and measuring electrodes are disposed within the conduit carrying the gas whose oxygen content is to be measured. In such devices the closed measuring end of the tube and electrodes are exposed to the gas which tends to plug the device. Furthermore, it is difficult to install and replace these sensors in the pipes.

In other commercial devices the entire stream of gas whose oxygen content is to be measured flows over the inside surface of the tube. In U.S. Pat. No. 3,216,911 — Kronenberg the entire gas stream flows in one end of the tube and out the other. In U.S. Pat. Nos. 3,442,773 — Wilson and 3,597,345 — Hickam et al the gas stream is carried through an inner tube into the closed measuring end of the zirconium oxide tube and thence out the other end of the tube. In these devices the sensor restricts the flow of the sample stream tending to plug the device and this is impractical in many applications.

SUMMARY OF THE INVENTION

In accordance with this invention a solid electrolyte tube with a closed end and an open end is mounted on a conduit through which a gas stream flows with the open end of the electrolyte tube in communication with the inside of the conduit. The closed end of the electrolyte tube is heated. Measuring electrodes are positioned on the outside and the inside surfaces of the heated portion of the tube. A portion of the gas from the sample stream diffuses, or is deflected by a baffle, into the closed end of the electrolyte tube where the oxygen content of that portion of the gas stream is measured.

In accordance with an important object of this invention the oxygen content of a sample gas stream is measured with little or no restriction on the flow of the sample gas stream. Because of this, large amounts of fly ash or even water can flow through the cell without harmful effect.

In accordance with another object of this invention the oxygen measuring cell is easy to construct and install and it is easy to replace the electrolyte tube without disrupting the conduit which carries the gas stream.

The foregoing and other objects, features and advantages of the invention will be better understood from the following more detailed description and appended claims.

DESCRIPTION OF A PARTICULAR EMBODIMENT

Figure 1:
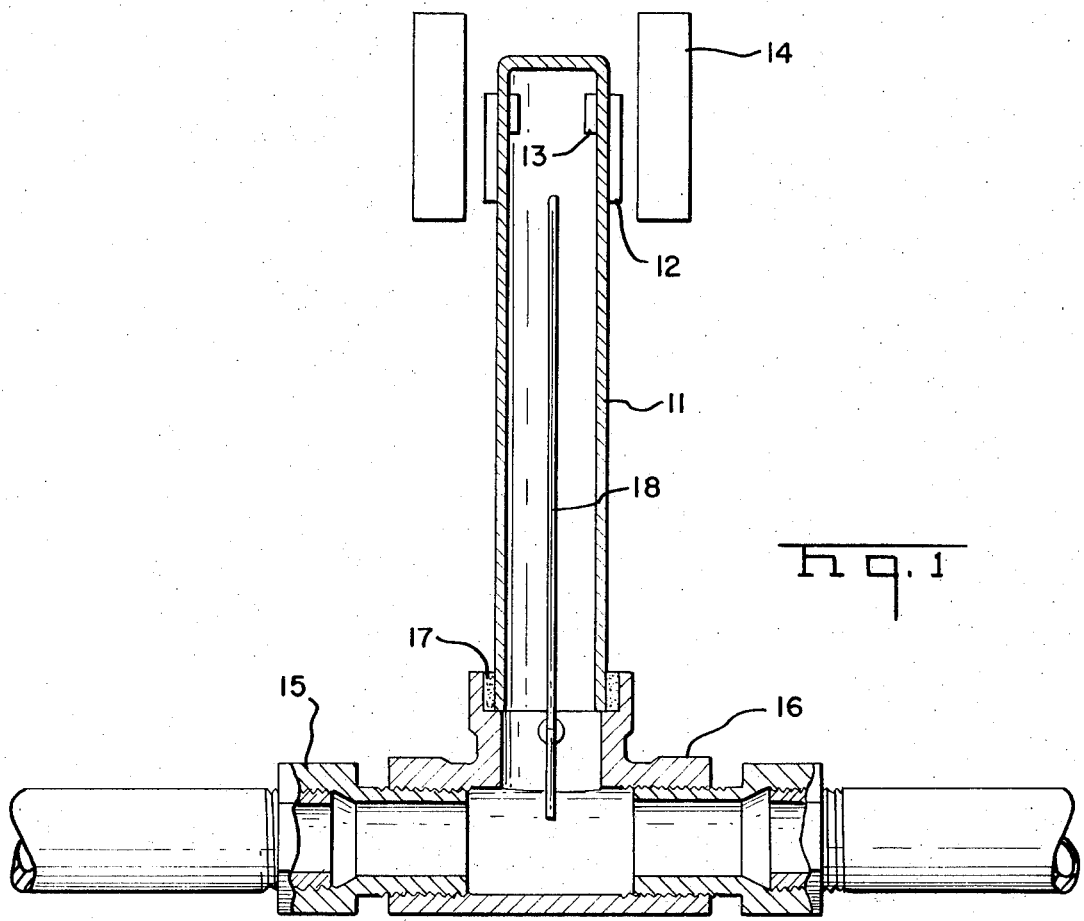
FIG. 1 shows the oxygen sensor of this invention.

Referring to FIG. 1 the sensor includes a tube 11 of solid electrolyte material exhibiting the property of oxygen ion conductivity with negligible electronic conductivity. Stabilized zirconium oxide is a particularly suitable and frequently used electrolyte. Platinum bands 12 and 13 on the inner and outer surfaces of the tube are electrodes. The electro-motive force (emf) across these electrodes is a function of oxygen partial pressure across the tube. The heater 14 heats the closed, measuring end of the tube. The open end of the tube 11 is in communication with the inside of the conduit 15 through which a stream of sample gas flows.

A metal tee-fitting 16 is connected in the conduit. The electrolyte tube 11 is fastened by cement 17 into one opening in the tee. A baffle 18 is disposed inside of the tube 11. The lower end of baffle 18 extends into the conduit and the upper end extends to the region of platinum bands 12 and 13. A portion of the sample gas is deflected across the left hand surface of baffle 18, into the region of the electrodes and thence over the right hand surface back into the sample gas stream. In this embodiment of the invention the baffle 18 is as wide as the inside diameter of the tube 11 and is fastened by fillets of ceramic to the inside of the tube 11. The baffle also causes gas to flow up into the cell by virtue of heat being conducted by the metal baffle thereby causing convection currents in the gas in contact with the baffle.

In many instances the baffle 18 can be removed. In this case, gas from the sample stream diffuses up the tube into the region of the electrodes and the oxygen content of the diffused gas is measured. While there is a certain time lag in this type of measurement, it is suitable in many applications.

Figure 2A:
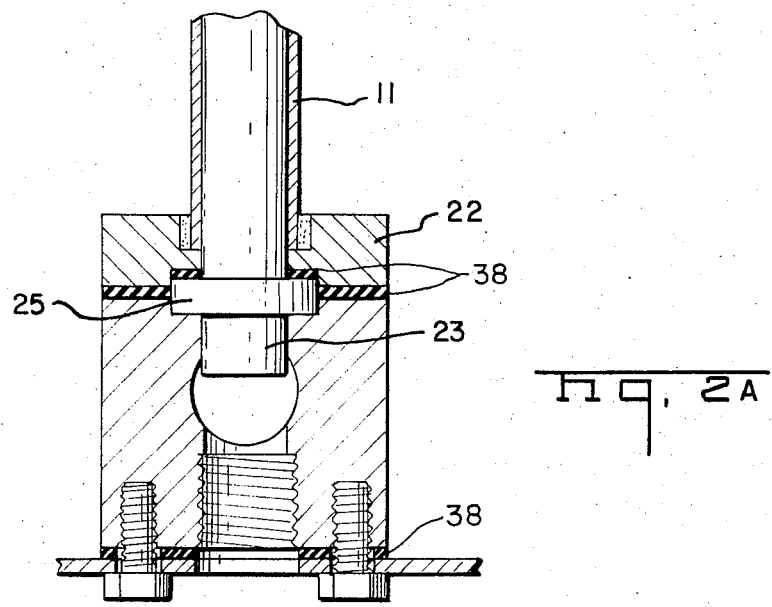
FIG. 2A is an end view of a section of FIG. 2.
Figure 2:
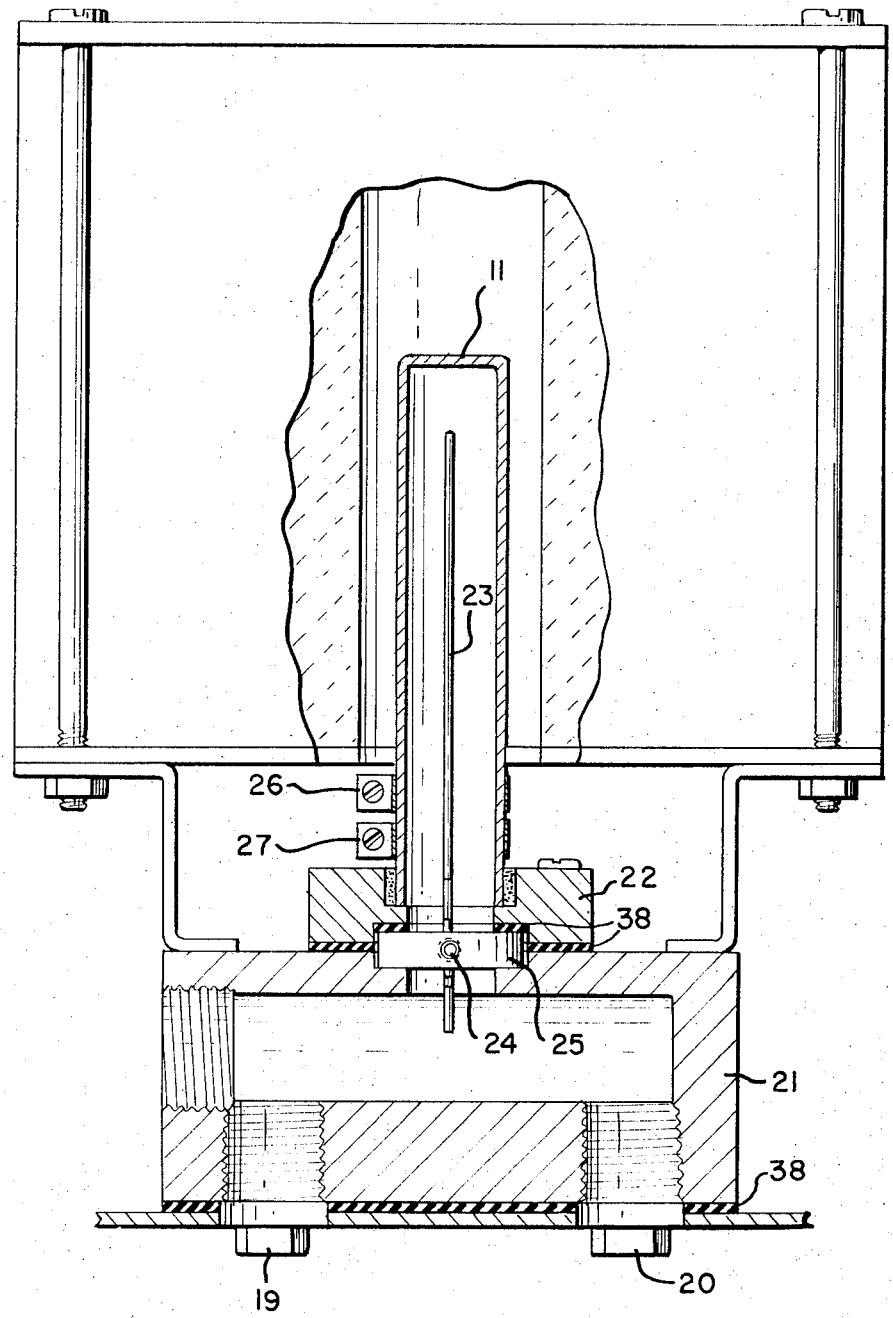
FIG. 2 shows a modified, preferred, embodiment of the invention.

A preferred embodiment of the invention is shown in FIG. 2. The sensor is connected to the conduit by the fittings 19 and 20. The sample gas stream passes through a U-shaped path in the block 21. This smooth path has the advantage that no moisture or particulate material can become trapped beneath the sensor. On the other hand, when the sensor is positioned in an ordinary metal tee-fitting as in FIG. 1 there is a natural moisture trap beneath the sensor and this can result in erroneous operation.

The zirconium oxide tube 11 is cemented into a metal ring 22 which is secured to the block 21. The baffle 23 is secured by a set screw 24 to the ring 25. The ring 25 is held in place between the ring 22 and the block 21. In order to insure against leakage of the gas being tested, a suitable, resilient gasketing material 38 is disposed beneath block 21, and at the joints formed between blocks 21, and rings 22 and 25.

The embodiment of FIG. 2 has the particular advantage that the ceramic tube 11 can be easily replaced without disconnecting the conduit. It is merely necessary to remove the ring 22 and replace the tube assembly.

Figure 3:
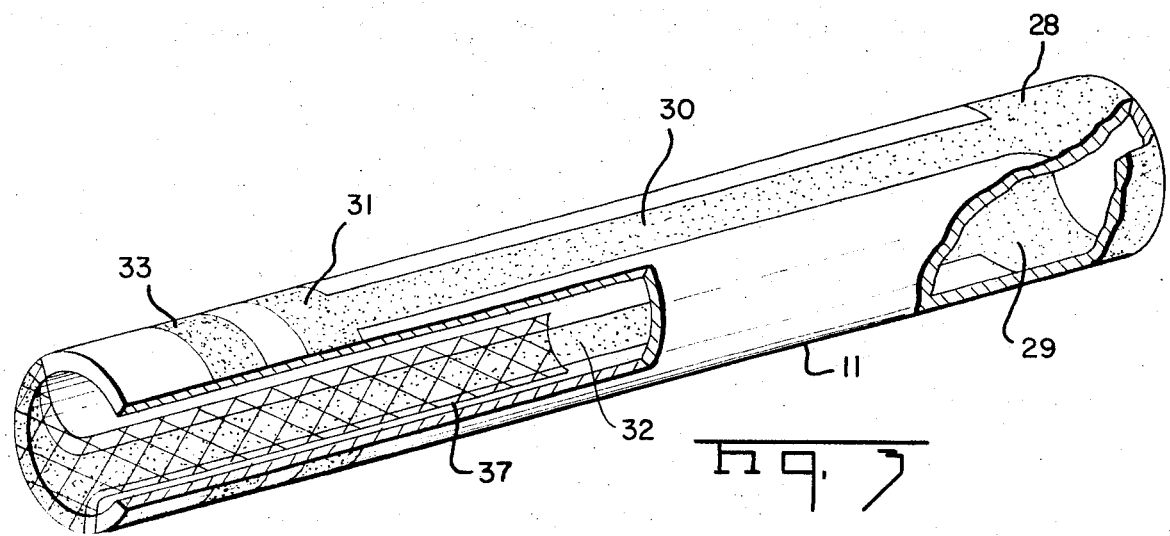
FIG. 3 shows the platinum electrode bands on the zirconium oxide tube.

A sensing circuit is connected to the electrical connectors 26 and 27. The connections between the platinum electrodes and these electrical connectors are better shown in FIG. 3. The closed, measuring end of the tube 11 has a stripe 28 of platinum paint around the outside thereof and a stripe 29 of platinum paint around the inside thereof. The platinum paint stripe 28 is connected by a thin painted stripe 30 to the band 31. The stripe 29 is connected to a thin stripe of paint 32 on the inside surface of the tube. This extends over the open end of the tube and thence to the band 33. The electrical connector 26 is clamped into position around the band 31 and the electrical connector 27 is clamped into position on the band 33.

In accordance with an important feature of this invention the inside platinum conductive band is coated with a ceramic glaze to protect it from corrosive gas which may otherwise cause the platinum to flake.

The crosshatching 37 shows the approximate area of the inside platinum conducting band that is coated with the ceramic glaze. The coating is important as it prevents the sulphuric acid normally present in flue gas from condensing on and attacking the platinum conductor in the cooler portions of the cell.

Figure 4:
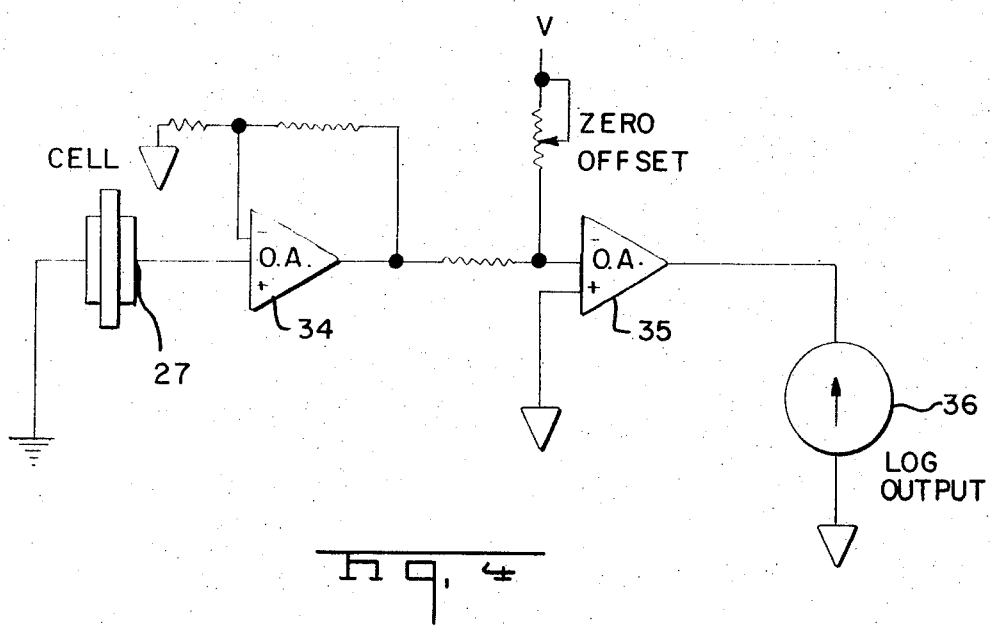
FIG. 4 is a schematic of the electronic sensing means.

The electrical sensing means is depicted in FIG. 4. Electrical connector 27 is connected to operational amplifier 34 which is connected to operational amplifier 35 which has a network for compensating for zero offset. The output is applied to a meter 36 which produces an indication of the log of the oxygen concentration of the gas. As is well understood, the output may be inverted and applied to antilog network which will then produce a linear output indication.

While a particular embodiment of the invention has been shown and described, various modifications are within the true spirit and scope of the invention.

What is claimed is:

1. A sensor for measuring the oxygen content of sample gas flowing in a stream in a conduit comprising:
    a tube of solid electrolyte material exhibiting the property of oxygen ion conductivity with negligable electronic conductivity, said tube having a closed end and an open end adapted to be in communication with the sample stream flowing in said conduit,
    a pair of electrodes respectively disposed on the outside surface and on the inside surface of said tube,
    a heater for heating that portion of said tube which said electrodes are in contact,
    a baffle disposed inside of said tube and having one end thereof adapted to extend into said conduit, the other end thereof extending to the region of said electrodes so that a portion of said sample gas stream is deflected across one surface of said baffle into the region of said electrodes and thence over the other surface of said baffle back into said sample gas stream, and
    means connected to said electrodes for measuring the oxygen content of said portion of said sample gas stream.

2. The apparatus recited in claim 1 wherein said electrodes are platinum bands disposed on the inside and outside surface of said tube.

3. The apparatus recited in claim 2 further comprising:
    platinum conductive strips on said tube extending from said electrode to the connections to said measuring means, and
    a ceramic coating over the conductive strip on the inside of said tube to protect it from corrosion.

4. The sensor recited in claim 1 wherein said tube is constructed of calcium stabilized zirconium oxide solid electrolyte.

* * * * *